June 1, 1943.  B. BACHKAI  2,320,904
VEHICLE PASSING MIRROR
Filed July 8, 1941
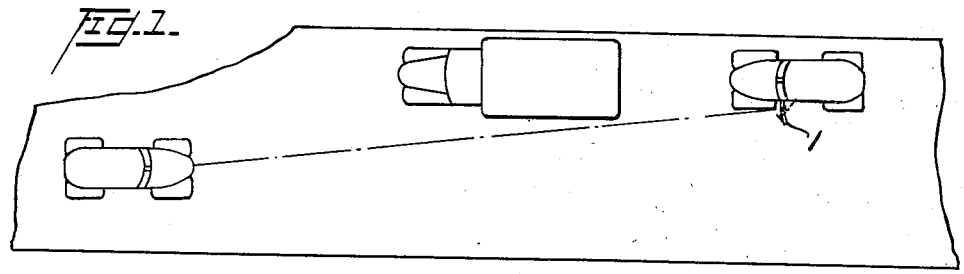
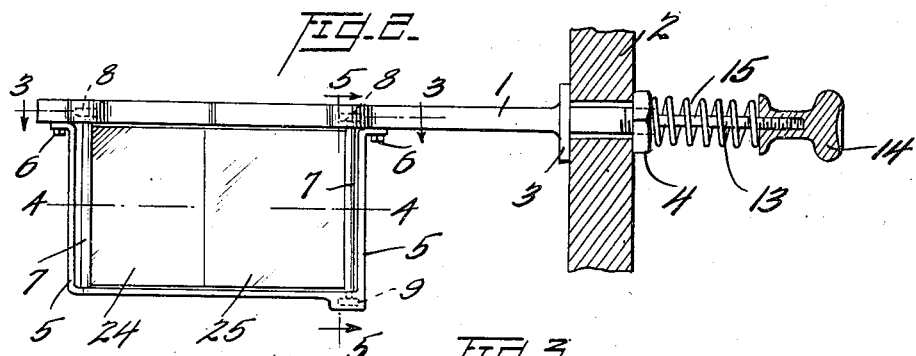
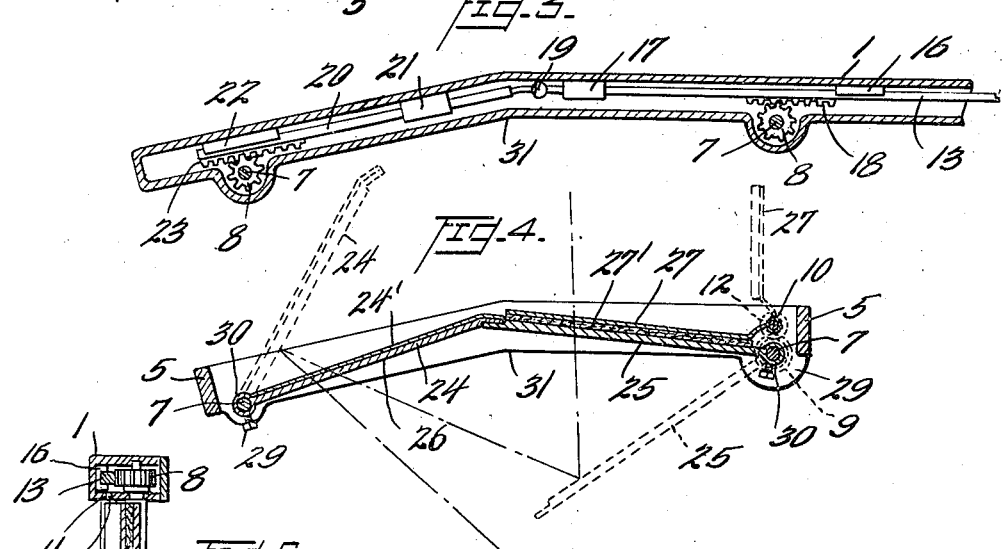
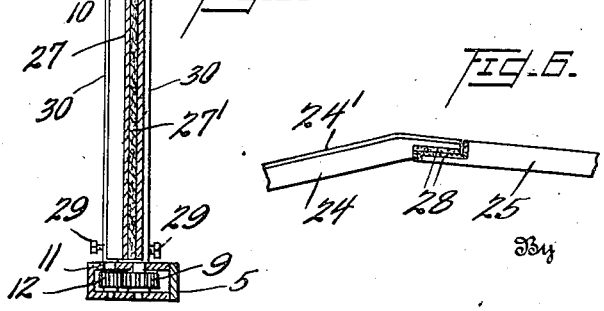
Inventor
Bela Bachkai,
Attorney Patented June 1, 1943

2,320,904

UNITED STATES PATENT OFFICE 2,320,904

VEHICLE PASSING MIRROR

Bela Bachkai, Jamaica, N. Y.

Application July 8, 1941, Serial No. 401,504

6 Claims. (Cl. 88—87)

This invention relates to a front view mirror for vehicles and automobiles in particular.

It frequently occurs that when driving in heavy traffic, a line of automobiles will be formed in either moving or temporarily stopped traffic with the automobiles so close to each other that the driver of one car will not be able to see around to the left side of the car immediately in front. Particularly when traffic is moving with the cars close together, a driver may wish to pull out of line and pass the cars in front of him, but without being able to see what is coming on the left side of the road in the approaching direction; to so move out of line is exceedingly hazardous. It would also be dangerous for the driver to move his head out of the sidewindow of the car to see around the line of cars, since a fast moving car in the opposite direction might hit the driver.

It is the object of this invention to provide a useful, simple, and efficient device to afford the driver of a car a view of the left side of the road in the approaching direction toward his own car whereby he may safely, quickly, and accurately determine whether the road is clear for him to pass one or more cars immediately in front of him.

A further object of the invention is to provide additional means whereby the device will be kept clean and ready for instant use at any desired moment.

Furthermore, additional means are provided whereby the device may be moved to operative position for serving as a front view mirror and may be automatically returned to its normal position wherein it serves as a rear view mirror.

Other objects will become apparent from a study of the appended specification in which—

Fig. 1 is a diagrammatic plan view showing the general operation of the applicant's device in use;

Fig. 2 is a vertical elevation of the device attached to a part of an automobile;

Fig. 3 is a horizontal plan section along the the line 3—3 of Fig. 2 showing details of the device;

Fig. 4 is a horizontal plan section taken on the line 4—4 of Fig. 2 showing further details;

Fig. 5 is a vertical section taken on the line 5—5 of Fig. 2 showing still further details; and Fig. 6 is an enlarged fragmentary detail of adjoining edges of the mirrors.

The instant device consists mainly of a suitable frame 1 which is preferably hollow on the interior and is attachable to a wall, door panel or other suitable member 2 of an automobile. This may be conveniently done as illustrated by a fixed flange 3 on the frame 1 engaging one side of the member 2, the frame terminating in a threaded portion to which a nut 4 is fixed to lock the frame to the member. A bracket 5 is suitably fixed to the frame 1 by studs 6 or any other suitable attaching means, or if preferred, the bracket 5 may be made integral with the frame 1 such as by casting.

Extending between the frame 1 and the lower portion of the bracket 5 which is horizontal to the frame are rotatable shafts 7 having conventional trunnions at opposite ends fixed in similarly conventional bearings in the bracket 5 and frame 1. The upper ends of the shafts 7 are suitably connected to gears 8. The shaft adjacent member 2 also has a gear 9 fixed to the lower end thereof.

Adjacent, and substantially parallel to the shaft 7 nearest the member 2 is another shaft 10 also mounted in suitable bearings 11 in the frame 1 and bracket 5 as clearly shown in Fig. 5. The lower end of shaft 10 also has a small gear 12 affixed thereto which gear preferably has a fewer number of teeth thereon than the gear 9 with which it meshes for reasons to be presently explained.

Slidable within the hollow interior of the frame 1 is a shaft 13 which extends from the frame into the interior of the automobile and terminates in a knob 14 which may be readily grasped or moved by the driver to manipulate the device. Surrounding shaft 13 is a coil spring 15 which serves to automatically return the device to normal or starting position after pressure on knob 14 is released. Knob 14 may be threaded on shaft 13 as shown, Fig. 2.

Affixed to the shaft 13 are suitable bearing blocks or guide members 16 and 17 which engage the inner walls of frame 1 to insure the proper operation of shaft 13. Also mounted on shaft 13 is a rack member 18 which meshes with one of the gears 8. The shaft 13 is connected by a suitable hinge or universal-like joint 19 to another section of shaft 20 which moves in the outer portion of the frame 1. Shaft 20 also has suitable bearing blocks or guides 21 and 22 to assure proper operation of the shaft. Mounted adjacent the outer end of shaft 20 is a second rack member 23 which suitably engages the other gear 8.

It will thus be seen that by pressing the knob 14 to the left as viewed in Fig. 2 the racks 18 and 23 will rotate the gears 8 in a counter-clockwise direction and will similarly move the shafts 7.

Affixed to the shafts 7 are cooperating mirrors 24 and 25. The mirror 24 is silvered or otherwise provided with a reflecting surface so as to serve as a rear vision mirror only. In other words, the side 26 only need be reflective. Mirror 25, however, is provided on both sides with reflective surfaces for purposes to be explained in the following.

The shaft 10 has one edge of an impervious plate 27 fixed thereto.

Preferably the adjacent edges of mirrors 24 and 25 are provided with suitable halved-together joints as shown in detail in Fig. 6. The inner or abutting surfaces are provided with a suitable cushioning means 28 which may be rubber, fiber, felt or other suitable material to eliminate as far as possible damage or breakage upon the engagement of adjacent edges when the mirrors are returned to the position shown in Fig. 4.

Upon the movement of the racks 18 and 23 in a left-hand direction as viewed in Fig. 3, which in turn will rotate the gears 8 and shafts 7 in a counter-clockwise direction, mirrors 24 and 25 will be moved to the position shown in dotted lines in Fig. 4. Also plate 27 will be moved to the dotted line position shown in Fig. 4, but because of gear 12 having fewer teeth than gear 9, the plate 27 will travel through a greater arc than mirror 25. This is necessary in order that the plate 27 will completely clear the front or approaching side of the mirror 25 when the car is moving forwardly.

Any object approaching the car from the opposite direction will be projected against the forward side of mirror 25 whence it will be reflected to the side 26 of mirror 24 and then reflected to the eye of the driver.

Immediately upon the release of the knob 14 due to the spring 13, the mirrors are returned to full line position shown in Fig. 4.

When installing the device on the car, the proper angle of the mirrors will be adjusted with respect to the vertical in order to properly reflect into the eye of the driver before tightening the nut 4. If desired, a suitable ball and socket joint, for instance, may be provided in the frame 1 between the flange 3 and the frame 5 in order that different angles may be obtained in a horizontal plane. No doubt a similar ball and socket or universal joint would also have to be provided in the shaft 13 were such a joint included in the frame 1.

As a further alternative, the frame 1, where it passes through the panel member 2 may be made ball like, and the panel member 2 may be hollowed spherically to receive the ball on the frame 1 and, with clamping plates arranged to hold the proper position, will permit adjustment of the assembly with respect to member 2.

Furthermore, when the device is being assembled or mounted on a car, it may be found convenient to use short threaded studs or set-screws 29 suitably threaded in sleeves 30 which may be provided to surround shafts 7 and also be secured to the respective mirrors to provide securing and adjusting means for the mirrors. A similar sleeve and set-screw could also be arranged on the shaft 10 in conjunction with plate 27 to also provide adjustment and securing means for said plate. In other words, if the mirrors and plate 27 are not aligned as they should be as shown in full lines in Fig. 4 after assembly and installation, the set-screws 29 may be loosened, the mirrors and/or plate adjusted and the set-screws retightened to hold the proper set of the cooperating mirrors and plate.

When the mirror assembly is serving as a rear vision mirror, the mirror 25 will be the main one being used for this purpose. The mirror 24 is preferably arranged at an angle to the mirror 25 and is so held in this relationship by providing an angle 31 in the frame 1. With the mirror 24 being more acutely angled toward the driver, this mirror will serve to reflect objects normally appering in the so-called "blind spot" behind any car into which the driver may not usually see. Thus the applicant's device affords two rear vision mirrors; one to permit viewing of objects generally to the rear and the second, objects which occur in the "blind spot."

In order to prevent confusion between the views afforded by these two rear vision mirrors, the cushioning means 28 will provide a suitable dividing line between the mirrors which will serve as a sort of clear line of demarcation between the relative views. This can be clearly seen from Fig. 6. In view of this angle being so provided the hinge or joint member 19 is necessary between the shafts 13 and 20.

It may be preferred to substitute a flexible cable-like member for the shafts 13 and 20 to which cable the racks 18 and 23 could be attached. Such cable could readily be installed by providing the proper dimensions to the cable and the interior of the frame 1 whereby kinking or coiling of the cable would be eliminated.

The plate 27 might suitably be termed a bug-catcher or deflecting plate. Inasmuch as mirror 25 is reflective on both surfaces, were the forwardmost surface of the mirror unprotected, insects, rain, mud, gravel, etc. would hit against and be lodged on the mirror so that after a certain length of time the reflective power of the mirror would be practically nil. Plate 27, however, protects the outer reflective surface of the mirror so that it is always ready for use and will provide a substantially clear reflecting surface.

Not only will this device be found useful for the main purpose intended which has been described in the foregoing, namely as a front vision mirror, but the same may be also found useful should the windshield become temporarily non-transparent for vision purposes such as by the accumulation of snow or ice on the same in which event plate 27 would keep the same material from accumulating on the forward side of mirror 25 and, for momentary glancing purposes, the instant device may be used to afford a view forward. Of course, if the mirrors were held open in the dotted line position in Fig. 4, under such circumstances for an appreciable time the forward surfaces of mirror 25 would also become useless for the purpose intended. Therefore, when being used under snow and ice conditions, only relatively momentary uses of the device should be made.

In the preferred construction, mirror 24 is provided with a fixed, outer, non-shatterable plate 24' to protect the mirror from breakage if struck from in front of the car by a gravel or rock. The plate 24', for instance, may be made integral with sleeve 30.

Also, to reduce the possibility of breaking of mirror 25 from plate 27 striking it in closing, a lining of felt, rubber, or other suitable material 27' is provided on the inside of plate 27 adjacent the mirror 25 so that it contacts the mirror surface when in the position shown in Fig. 4. The lining may be a solid sheet or merely a band adjacent the perimeter of the plate and will serve to further exclude rain, dirt, etc., from the forward mirror surface.

One further and very important advantage of the applicant's device resides in the fact that when driving at night, approaching headlights will not reflect into the driver's eyes since the forward surface of mirror 25 is normally covered. Nor will the headlights of the first driver's car reflect into the eyes of oncoming drivers as in the case of previously developed front vision mirrors not having the split, pivoted mirror feature of this invention.

It will thus be seen in summary that the applicant has provided a novel, compact and attractive device having a plurality of uses, namely, that of a front vision mirror and two rear vision mirrors arranged at an angle to each other whereby the general rear scene may be viewed and also any object appearing in the so-called "blind spot." The device as explained above, may also be found useful for viewing the road ahead when the windshield is obstructed.

While the present embodiment and description of the invention comprises the preferred construction, it is to be understood that the construction or arrangement may be varied within the scope of the appended claims without departing from the spirit of the invention.

I claim:

1. A front and rear view mirror assembly for vehicles comprising in combination, a support adapted to be attached to one side of a vehicle, two spaced and substantially parallel shafts pivotally mounted on said support, said shafts being substantially vertical to the horizontal when the support is mounted on said vehicle, a pair of mirrors respectively secured at one end to each of said shafts and disposed with the free ends of said mirrors in substantial abutting relationship in the normal position thereof, said mirrors respectively having reflecting surfaces on opposed sides thereof in said normal position, whereby one of said mirrors normally serves as a rear vision mirror, and means adapted to be actuated to rotate said shafts in the same rotary direction to move the free ends of said mirrors apart whereby the mirror having its reflecting surface facing forward of the vehicle is adapted to reflect the image of an object forward of the vehicle into the other mirror and said latter mirror is adapted to reflect said image into the eye of the vehicle driver.

2. A front and rear view mirror assembly for vehicles comprising in combination, a support adapted to be attached to one side of a vehicle, two spaced and substantially parallel shafts pivotally mounted on said support, said shafts being substantially vertical to the horizontal when the support is in operative position, a pair of mirrors respectively secured at one end to each of said shafts and disposed with the free ends of said mirrors in substantially abutting relationship in the normal position thereof, said mirrors being disposed at an angle to each other and respectively provided with reflecting surfaces on opposed sides thereof in the normal position of said mirrors whereby one of said mirrors normally serves as a rear vision mirror, and means adapted to be actuated to rotate said shafts in the same rotary direction to move the free ends of said mirrors apart into non-parallel relationship whereby the mirror having its reflecting surface facing forward of the vehicle is adapted to reflect the image of an object forward of the vehicle into the other mirror and said latter mirror is adapted to reflect said image into the eye of the vehicle driver.

3. A front and rear view mirror assembly for vehicles comprising in combination, a support adapted to be attached to one side of a vehicle and including spaced pairs of bearings, two spaced and substantially parallel shafts respectively pivotally mounted in said pairs of bearings, said shafts being substantially vertical in operative position, a pair of mirrors respectively secured at one end to each of said shafts and disposed with the free ends of said mirrors in substantial abutting relationship in the normal position thereof, said mirrors respectively having reflecting surfaces on opposed sides thereof in said normal position, whereby one of said mirrors normally serves as a rear vision mirror, and means adapted to be actuated to rotate said shafts in the same rotary direction to move the free ends of said mirrors apart whereby the mirror having its reflecting surface facing forward of the vehicle is adapted to reflect the image of an object forward of the vehicle into the other mirror and said latter mirror is adapted to reflect said image into the eye of the vehicle driver.

4. A front and rear view mirror assembly for vehicles comprising in combination, a support adapted to be attached to one side of a vehicle, two spaced and substantially parallel shafts pivotally mounted on said support, said shafts being substantially vertical to the horizontal when the support is mounted on said vehicle, a pair of mirrors respectively secured at one end to each of said shafts and disposed with the free ends of said mirrors in substantial abutting relationship in the normal position thereof, said mirrors respectively having reflecting surfaces on opposed sides thereof in said normal position, whereby one of said mirrors normally serves as a rear vision mirror, and means comprising a member disposed within said support and extending into the interior of the vehicle, said member being operatively connected to said shafts and adapted upon actuation from within the vehicle to rotate said shafts in the same rotary direction to move the free ends of said mirrors apart whereby the mirror having its reflecting surface facing forward of the vehicle is adapted to reflect the image of an object forward of the vehicle into the other mirror and said latter mirror is adaped to reflect said image into the eye of the vehicle driver.

5. A front and rear view mirror assembly for vehicles comprising in combination, a support adapted to be attached to one side of a vehicle, two spaced and substantially parallel shafts pivotally mounted on said support, said shafts being substantially vertical to the horizontal when the support is mounted on said vehicle, a pair of mirrors respectively secured at one end to each of said shafts and disposed with the free ends of said mirrors in substantial abutting relationship in the normal position thereof, said mirrors respectively having reflecting surfaces on opposed sides thereof in said normal position, whereby one of said mirrors normally serves as a rear vision mirror, means adapted to be actuated to rotate said shafts in the same rotary direction to move the free ends of said mirrors apart whereby the mirror having its reflecting surface facing forward of the vehicle is adapted to reflect the image of an object forward of the vehicle into the other mirror and said latter mirror is adapted to reflect said image into the eye of the vehicle driver, and means composed of impervious and non-shatterable material respectively disposed adjacent the forward surface of said mirrors when in their normal position.

6. A front and rear view mirror assembly for vehicles comprising in combination, a support adapted to be attached to one side of a vehicle, two spaced and substantially parallel shafts pivotally mounted on said support, said shafts being substantially vertical to the horizontal when the support is mounted on said vehicle, a pair of mirrors respectively secured at one end to each of said shafts and disposed with the free ends of said mirrors in substantial abutting relationship in the normal position thereof, said mirrors respectively having reflecting surfaces on opposed sides thereof in said normal position, whereby one of said mirrors normally serves as a rear vision mirror, means adapted to be actuated to rotate said shafts in the same rotary direction to move the free ends of said mirrors apart whereby the mirror having its reflecting surface facing forward of the vehicle is adapted to reflect the image of an object forward of the vehicle into the other mirror and said latter mirror is adapted to reflect said image into the eye of the vehicle driver, and a shield composed of impervious and non-shatterable material pivotally mounted on said support for movement about a vertical axis, said shield being disposed adjacent the forward surface of said mirror having its reflecting surface facing forward and operatively associated with said mirror rotating means whereby when said mirrors are moved apart said shield is rotated away from the forward surface of said normally shielded mirror.

BELA BACHKAI.